United States Patent
Uchida

(10) Patent No.: US 11,422,343 B2
(45) Date of Patent: Aug. 23, 2022

(54) CATADIOPTRIC SYSTEM AND OPTICAL DEVICE

(71) Applicant: Nikon Corporation, Tokyo (JP)

(72) Inventor: Kensuke Uchida, Soraku-gun (JP)

(73) Assignee: NIKON CORPORATION, Tokyo (JP)

(*) Notice: Subject to any disclaimer, the term of this patent is extended or adjusted under 35 U.S.C. 154(b) by 616 days.

(21) Appl. No.: 16/366,764

(22) Filed: Mar. 27, 2019

(65) Prior Publication Data

US 2019/0219804 A1     Jul. 18, 2019

Related U.S. Application Data

(63) Continuation of application No. PCT/JP2017/032660, filed on Sep. 11, 2017.

(30) Foreign Application Priority Data

Oct. 3, 2016   (JP) .............................. JP2016-195940

(51) Int. Cl.
  *G02B 17/08*     (2006.01)

(52) U.S. Cl.
  CPC ..... *G02B 17/0808* (2013.01); *G02B 17/0856* (2013.01)

(58) Field of Classification Search
  CPC ............... G02B 17/08; G02B 17/0804; G02B 17/0808; G02B 17/0856
  USPC .................................. 359/364–366, 726–731
  See application file for complete search history.

(56) References Cited

U.S. PATENT DOCUMENTS

| 4,523,816 A | * | 6/1985 | Kreitzer | G02B 17/0856 |
| | | | | 359/731 |
| 4,547,045 A | * | 10/1985 | Canzek | G02B 17/0852 |
| | | | | 359/731 |
| 4,666,259 A | * | 5/1987 | Iizuka | G02B 17/0884 |
| | | | | 359/731 |

(Continued)

FOREIGN PATENT DOCUMENTS

| GB | 2136149 A | * | 9/1984 | ............. G02B 13/14 |
| GB | 2177812 A | * | 1/1987 | ........... G02B 13/146 |

(Continued)

OTHER PUBLICATIONS

Yudin, "Study of aberrational performance of Klevtsov family of sub-aperture catadioptric telescopes and field correctors for them," Proc. SPIE 8550, Optical Systems Design 2012, 85500M (Dec. 18, 2012); doi:10.1117/12.981320. (Year: 2012).*

(Continued)

*Primary Examiner* — Nicholas R. Pasko
(74) *Attorney, Agent, or Firm* — SGPatents PLLC

(57) ABSTRACT

A catadioptric system (LS) is provided with: a first reflecting mirror (M1) that reflects light from an object; a second reflecting mirror (M2) that reflects light reflected by the first reflecting mirror (M1); a first lens group (G1) that transmits light reflected by the first reflecting mirror (41) and traveling toward the second reflecting mirror (M2), and transmits light reflected by the second reflecting mirror (M2); and a second lens group (G2) that transmits light reflected by the second reflecting mirror (M2) and transmitted through the first lens group (G1). The catadioptric system is configured that an image of the object is formed by light transmitted through the second lens group (G2).

17 Claims, 9 Drawing Sheets

(56) References Cited

U.S. PATENT DOCUMENTS

| | | | | |
|---|---|---|---|---|
| 4,714,307 | A * | 12/1987 | Palmer | G02B 17/0856 359/728 |
| 6,169,637 | B1 * | 1/2001 | Tsunashima | G02B 17/086 359/732 |
| 7,236,297 | B1 * | 6/2007 | Ackermann | G02B 17/0808 359/399 |
| 7,554,728 | B1 * | 6/2009 | Ackermann | G02B 17/0808 359/399 |
| 2008/0151365 | A1 * | 6/2008 | Shafer | G03F 7/70225 359/365 |
| 2012/0320187 | A1 | 12/2012 | Katashiba et al. | |
| 2013/0010376 | A1 * | 1/2013 | Hatakeyama | G02B 17/0804 359/731 |
| 2013/0265475 | A1 * | 10/2013 | Tochigi | G03B 17/14 348/335 |
| 2014/0049841 | A1 * | 2/2014 | Ryu | G02B 17/0808 359/745 |

FOREIGN PATENT DOCUMENTS

| | | |
|---|---|---|
| JP | S53-076830 A | 7/1978 |
| JP | H03-208005 A | 9/1991 |
| JP | 2011-248122 A | 12/2011 |
| JP | 2013-015713 A | 1/2013 |
| JP | 2013-218022 A | 10/2013 |

OTHER PUBLICATIONS

Office Action dated Oct. 23, 2019 in Japanese Patent Application No. 2018-543801.

International Search Report from International Patent Application No. PCT/JP2017/032660, dated Nov. 28, 2017.

English translation of International Preliminary Report on Patentability from International Patent Application No. PCT/JP2017/032660, dated Apr. 18, 2019.

* cited by examiner

CATADIOPTRIC SYSTEM AND OPTICAL DEVICE

TECHNICAL FIELD

The present invention relates to a catadioptric system and an optical device.

TECHNICAL BACKGROUND

For example, Patent Literature 1 discloses a catadioptric system having a combination of reflecting mirrors and lenses. Such a catadioptric system is preferably a simple configuration from the viewpoint of manufacturing cost.

PRIOR ARTS LIST

Patent Document

Patent literature 1: Japanese Laid-Open Patent Publication No. 2011-248122(A)

SUMMARY OF THE INVENTION

A catadioptric system according to a first aspect comprises a first reflecting mirror that reflects light from an object, a second reflecting mirror that reflects light reflected by the first reflecting mirror, a first lens group that transmits light reflected by the first reflecting mirror and traveling toward the second reflecting mirror, and transmits light reflected by the second reflecting mirror, and a second lens group that transmits light reflected by the second reflecting mirror and transmitted through the first lens group. An image of the object is formed by light transmitted through the second lens group, and the following conditional expression is satisfied:

$$0 \le f/|f2| < 5.50$$

where, f: a focal length of the catadioptric system
|f2|: a focal length of the second lens group.

The optical device according to a second aspect comprises the catadioptric system described above.

DESCRIPTION OF THE EMBODIMENTS

Figure 9:
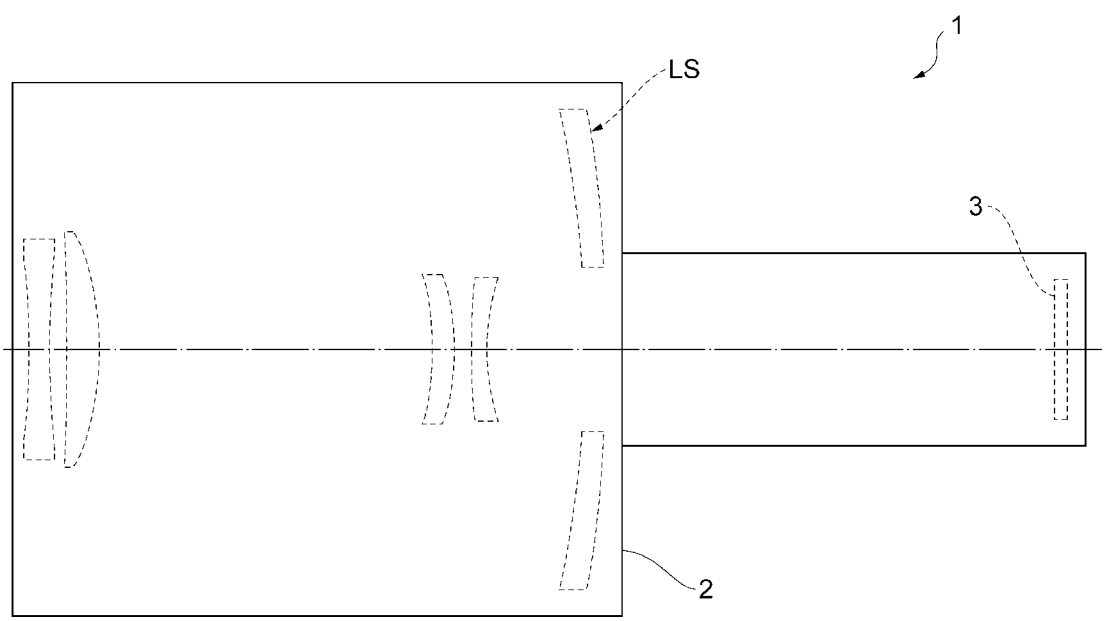
FIG. 9 shows a schematic diagram of a telescope.

Hereinafter, a catadioptric system and an optical device of the present embodiment will be described with reference to the drawings. A Cassegrain type telescope 1 is shown in FIG. 9 as an optical device comprising the catadioptric system of the present embodiment. As shown in FIG. 9, the telescope 1 is constituted by having a lens barrel 2, a catadioptric system LS housed in the distal end side of the lens barrel 2, and a detection unit 3 housed in the proximal end side of the lens barrel 2. The detection unit 3 is constituted of an image sensor or the like. In such a telescope 1, light from an object is focused by the catadioptric system LS to be guided to the detection unit 3, and imaged on an imaging surface of the detection unit 3. An image of the object focused and formed by the catadioptric system LS is detected by the detection unit 3.

Figure 1:
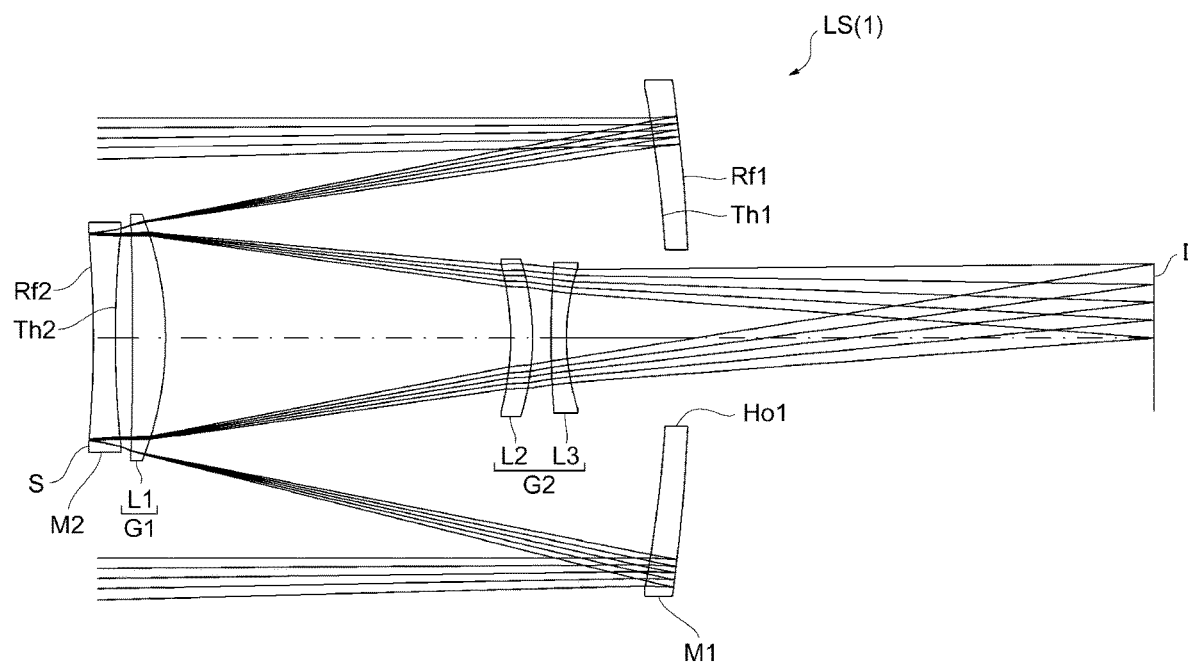
FIG. 1 shows a configuration diagram of a catadioptric system according to Example 1.

As shown in FIG. 1, a catadioptric system LS(1), as an example of the catadioptric system LS according to the present embodiment, comprises a first reflecting mirror M1, a second reflecting mirror M2, and a first lens group G1. The first reflecting mirror M1 reflects the light from the object. The second reflecting mirror M2 reflects light reflected by the first reflecting mirror M1. The first lens group G1 transmits light reflected by the first reflecting mirror M1 and traveling toward the second reflecting mirror M2, and transmits light reflected by the second reflecting mirror M2. This makes it possible to provide the catadioptric system LS with a simple structure and low manufacturing cost, and the telescope 1 (optical device) including the same. The catadioptric system LS according to the present embodiment may be a catadioptric system LS(2) shown in FIG. 3, a catadioptric system LS(3) shown in FIG. 5, or a catadioptric system LS(4) shown in FIG. 7.

It is preferable that the catadioptric system LS according to the present embodiment comprises a second lens group G2 that transmits light reflected by the second reflecting mirror M2 and transmitted through the first lens group G1, and the image of the object is formed by light transmitted through the second lens group G2. This makes it possible to excellently correct spherical aberration and astigmatism.

In the catadioptric system LS according to the present embodiment, it is preferable to satisfy the condition expressed by the following conditional expression (1):

$$0 \le f/|f2| < 5.50 \qquad (1)$$

where, f: a focal length of the catadioptric system LS
|f2|: a focal length of the second lens group G2.

The conditional expression (1) is a conditional expression that defines an appropriate range for the ratio of the focal length of the entire catadioptric system LS to the focal length of the second lens group G2. Satisfying the conditional expression (1) makes it possible to excellently correct spherical aberration and axial chromatic aberration, while suppressing occurrence of curvature of field and distortion.

When a corresponding value of the conditional expression (1) is higher than an upper limit value, it becomes difficult to suppress the occurrence of curvature of field and distortion, and a successful image tends not to be obtained. To secure the effect of the present embodiment, the upper limit value of the conditional expression (1) may be preferably 4.80.

When the corresponding value of the conditional expression (1) is lower than a lower limit value, it becomes difficult to suppress the occurrence of curvature of field and distortion likewise, and a successful image tends not to be obtained. To secure the effect of the present embodiment, the lower limit value of the conditional expression (1) may be preferably 0.03.

In the catadioptric system LS according to the present embodiment, it is preferable that the first reflecting mirror M1 has a concave shape on a light incident side, and the second reflecting mirror M2 has a convex shape on the light incident side. This makes it possible to focus the light from the object and form an image.

In the catadioptric system LS according to the present embodiment, it is preferable that the first reflecting mirror M1 has an aperture part Ho1, and the aperture part Ho1 is provided at a position through which the light reflected by the second reflecting mirror M2 and transmitted through the first lens group G1 can pass. For example, the aperture part Ho1 may be provided at the central portion of the first reflecting mirror M1. This makes it possible to provide the catadioptric system LS having a short overall length with respect to the focal length. All the light reflected by the second reflecting mirror M2 and transmitted through the first lens group G1 may be configured to pass through the aperture part Ho1, or at least a part of the light reflected by the second reflecting mirror M2 and transmitted through the first lens group G1 may be configured to pass through the aperture part Ho1.

In the catadioptric system LS according to the present embodiment, it is preferable that the second reflecting mirror M2 is arranged to face the aperture part Ho1 of the first reflecting mirror M1, and the first lens group G1 is arranged between the first reflecting mirror M1 and the second reflecting mirror M2. This makes it possible to provide the catadioptric system LS having a short overall length with respect to the focal length.

In the catadioptric system LS according to the present embodiment, it is preferable that the first reflecting mirror M1 is a rear-surface reflecting type mirror having a first transmitting surface Th1 that can transmit the light from the object, and a first reflecting surface Rf1 that can reflect light transmitted through the first transmitting surface Th1, and a radius of curvature of the first transmitting surface Th1 is different from a radius of curvature of the first reflecting surface Rf1. This makes it possible to excellently correct spherical aberration and coma aberration.

In the catadioptric system LS according to the present embodiment, it is preferable to satisfy the condition expressed by the following conditional expression (2):

$$0.50 < RM1a/RM1b < 2.00 \quad (2)$$

where,

RM1a: the radius of curvature of the first transmitting surface Th1

RM1b: the radius of curvature of the first reflecting surface Rf1.

The conditional expression (2) is a conditional expression for defining an appropriate range for the ratio of the radius of curvature of the first transmitting surface Th1 to the radius of curvature of the first reflecting surface Rf1 of the first reflecting mirror M1. Satisfying the conditional expression (2) makes it possible to excellently correct spherical aberration and coma aberration while suppressing occurrence of lateral chromatic aberration.

When a corresponding value of the conditional expression (2) is higher than an upper limit value, it becomes difficult to suppress the occurrence of lateral chromatic aberration, and high resolution tends not to be obtained. To secure the effect of the present embodiment, the upper limit value of the conditional expression (2) may be preferably 1.50.

When the corresponding value of the conditional expression (2) is lower than a lower limit value, it becomes difficult to suppress the lateral chromatic aberration likewise, and a high resolution tends not to be obtained. To secure the effect of the present embodiment, the lower limit value of the conditional expression (2) may be preferably 0.60.

In the catadioptric system LS according to the present embodiment, it is preferable that the first transmitting surface Th1 and the first reflecting surface Rf1 are spherical. This makes it easier to manufacture the first reflecting mirror M1 having the first transmitting surface Th1 and the first reflecting surface Rf1 compared to an aspherical lens, allowing to provide the catadioptric system LS with low manufacturing cost.

In the catadioptric system LS according to the present embodiment, it is preferable that the second reflecting mirror M2 is a rear-surface reflecting type mirror having a second transmitting surface Th2 that can transmit the light from the first reflecting mirror M1, and a second reflecting surface Rf2 that can reflect light transmitted through the second transmitting surface Th2, and a radius of curvature of the second transmitting surface Th2 is different from a radius of curvature of the second reflecting surface Rf2. This makes it possible to excellently correct spherical aberration and coma aberration.

In the catadioptric system LS according to the present embodiment, it is preferable to satisfy the condition expressed by the following conditional expression (3):

$$-2.00 < RM2a/RM2b < -0.50 \quad (3)$$

where,

RM2a: the radius of curvature of the second transmitting surface Th2

RM2b: the radius of curvature of the second reflecting surface Rf2.

The conditional expression (3) is a conditional expression for defining an appropriate range for the ratio of the radius of curvature of the second transmitting surface Th2 to the radius of curvature of the second reflecting surface Rf2 of the second reflecting mirror M2. Satisfying the conditional expression (3) makes it possible to excellently correct spherical aberration and coma aberration.

When a corresponding value of the conditional expression (3) is higher than an upper limit value, it becomes difficult to correct the spherical aberration and coma aberration, and high resolution tends not to be obtained. To secure the effect of the present embodiment, the upper limit value of the conditional expression (3) may be preferably −0.60.

When the corresponding value of the conditional expression (3) is lower than a lower limit value, it becomes difficult to correct the spherical aberration and coma aberration likewise, and high resolution tends not to be obtained. To secure the effect of the present embodiment, the lower limit value of the conditional expression (3) may be preferably −1.50.

In the catadioptric system LS according to the present embodiment, it is preferable that the second transmitting surface Th2 and the second reflecting surface Rf2 are spherical. This makes it easier to manufacture the second reflecting mirror M2 having the second transmitting surface Th2 and the second reflecting surface Rf2 compared to an aspherical lens, allowing to provide the catadioptric system LS with low manufacturing cost.

In the catadioptric system LS according to the present embodiment, it is preferable that the first lens group G1 consists of one lens, and satisfies the condition expressed by the following conditional expression (4):

$$-0.50 < R1a/R1b < 1.50 \quad (4)$$

where,

R1a: a radius of curvature of a lens surface of the lens of the first lens group G1 on the side on which the first reflecting mirror M1 is arranged R1b: a radius of curvature of a lens surface of the lens of the first lens group G1 on the side on which the second reflecting mirror M2 is arranged.

The conditional expression (4) is a conditional expression that defines an appropriate range for the ratio of the radius of curvature of the lens surface on the side on which the first reflecting mirror M1 is arranged to the radius of curvature of the lens surface on the side on which the second reflecting mirror M2 is arranged of the lens of the first lens group G1. Satisfying the conditional expression (4) makes it possible to excellently correct coma aberration.

When a corresponding value of the conditional expression (4) is higher than an upper limit value, it becomes difficult to correct the coma aberration, and high resolution tends not to be obtained. To secure the effect of the present embodiment, the upper limit value of the conditional expression (4) may be preferably 1.20.

When the corresponding value of the conditional expression (4) is lower than a lower limit value, it becomes difficult to correct the coma aberration likewise, and high resolution tends not to be obtained. To secure the effect of the present embodiment, the lower limit value of the conditional expression (4) may be preferably set to zero.

In the catadioptric system LS according to the present embodiment, it is preferable that the first lens group G1 consists of one positive meniscus lens. This makes it possible to excellently correct coma aberration.

In the catadioptric system LS according to the present embodiment, it is preferable that each lens surface of the first lens group G1 is spherical. This makes it easier to manufacture the first lens group G1 compared to an aspherical lens, allowing to provide the catadioptric system LS with low manufacturing cost.

In the catadioptric system LS according to the present embodiment, it is preferable that the first reflecting mirror M1 is a rear-surface reflecting type mirror having the first transmitting surface Th1 that can transmit the light from the object, and the first reflecting surface Rf1 that can reflect the light transmitted through the first transmitting surface Th1, and the second reflecting mirror M2 is a rear-surface reflecting type mirror having the second transmitting surface Th2 that can transmit the light from the first reflecting mirror M1, and the second reflecting surface Rf2 that can reflect the light transmitted through the second transmitting surface Th2, and the condition expressed by the following conditional expression (5) is satisfied:

$$0.80 < RM1b/RM2b < 2.00 \quad (5)$$

where,

RM1b: the radius of curvature of the first reflecting surface Rf1

RM2b: the radius of curvature of the second reflecting surface Rf2.

The conditional expression (5) is a conditional expression that defines an appropriate range for the ratio of the radius of curvature of the first reflecting surface Rf1 of the first reflecting mirror M1 to the radius of curvature of the second reflecting surface Rf2 of the second reflecting mirror M2. Satisfying the conditional expression (5) makes it possible to excellently correct curvature of field.

When a corresponding value of conditional expression (5) is higher than an upper limit value, it becomes difficult to correct the curvature of field, and it tends to be difficult to widen an angle of view. To secure the effect of the present embodiment, the upper limit value of the conditional expression (5) may be preferably 1.70.

When the corresponding value of conditional expression (5) is lower than a lower limit value, it becomes difficult to correct the curvature of field likewise, and it tends to be difficult to widen the angle of view. To secure the effect of the present embodiment, the lower limit value of the conditional expression (5) may be preferably 0.90.

In the catadioptric system LS according to the present embodiment, it is preferable that the second lens group G2 consists of a first positive lens, a negative lens, and a second positive lens, which are arranged in order from the object side along the optical axis. This makes it possible to excellently correct spherical aberration and astigmatism.

In the catadioptric system LS according to the present embodiment, it is preferable that each lens surface of the second lens group G2 is spherical. This makes it easier to manufacture the second lens group G2 compared to an aspherical lens, allowing to provide the catadioptric system LS with low manufacturing cost.

In the catadioptric system LS according to the present embodiment, it is preferable that the first reflecting mirror M1 is a rear-surface reflecting type mirror having the first transmitting surface Th1 that can transmit the light from the object, and the first reflecting surface Rf1 that can reflect the light transmitted through the first transmitting surface Th1, the second reflecting mirror M2 is a rear-surface reflecting type mirror having the second transmitting surface Th2 that can transmit the light from the first reflecting mirror M1, and the second reflecting surface Rf2 that can reflect the light transmitted through the second transmitting surface Th2, and an optical element provided with the first transmitting surface Th1 and the first reflecting surface Rf1 constituting the first reflecting mirror M1, an optical element provided with the second transmitting surface Th2 and the second reflecting surface Rf2 constituting the second reflecting mirror M2, and lenses constituting the first lens group G1 and the second lens group G2 are made of the same material. This makes it possible to uniformize thermal expansion or thermal contraction of the catadioptric system LS, so that deformation of the catadioptric system LS accompanying temperature change can be suppressed, and the catadioptric system LS can be used even in a harsh environment where a temperature becomes high or low.

In the catadioptric system LS according to the present embodiment, it is preferable that a coefficient of linear thermal expansion of the above-mentioned material is $6 \times 10^{-7}$/K or less. As described above, using the material having a small coefficient of linear thermal expansion can suppress the deformation of the catadioptric system LS accompanying the temperature change, so that the catadioptric system LS can be used, even in a harsh environment where a temperature becomes high or low.

In the catadioptric system LS according to the present embodiment, it is preferable that a specific gravity of the above-mentioned material is 3 g/cm$^3$ or less. As described above, using the material having a small specific gravity can lighten the catadioptric system LS, so that the catadioptric system LS can be preferably mounted also on a small unmanned flying device, for example.

In the catadioptric system LS according to the present embodiment, it is preferable that the above-mentioned material is quartz glass. As described above, using the material having a small coefficient of linear thermal expansion can suppress the deformation of the catadioptric system LS accompanying the temperature change, so that the catadioptric system LS can be used even in a harsh environment where a temperature becomes high or low. Quartz glass is classified as a hard material that requires time and effort in complicated processing such as aspheric surface, but as described above, forming the optical surface to a spherical surface that is easy to process makes it possible to use even hard quartz glass easily.

In the catadioptric system LS according to the present embodiment, it is preferable to satisfy the condition expressed by the following conditional expression (6):

$$|Dexit|/f \geq 0.3 \qquad (6)$$

where,

|Dexit|: a distance from the image surface to an exit pupil of the catadioptric system LS.

The conditional expression (6) is a conditional expression that defines an appropriate range for the ratio of the distance from the image surface to the exit pupil of the catadioptric system LS to the focal length of the entire catadioptric system LS. By satisfying the conditional expression (6), when measuring the optical performance such as the focal length and wavefront aberration of the catadioptric system LS, it becomes possible to perform measurement without rotating a measuring device with respect to the catadioptric system LS. Therefore, it makes it possible to simplify the device configuration for measuring the optical performance of the catadioptric system LS. The distance from the image surface to the exit pupil of the catadioptric system LS is an absolute value when a distance in the direction from the object to the image surface is set to positive.

When a corresponding value of the conditional expression (6) is lower than a lower limit value, when measuring the optical performance such as the focal length and wavefront aberration of the catadioptric system LS, it is necessary to perform measurement by rotating the measuring device with respect to the catadioptric system LS, and the device configuration for measuring the optical performance of the catadioptric system LS becomes complicated. Further, the upper limit value of the conditional expression (6) may be set to 6.0 or less.

Although the Cassegrain type telescope 1 has been described as an example of the optical device comprising the catadioptric system of the present embodiment, the present invention is not limited to this. For example, the optical device may be an imaging device comprising the catadioptric system of the present embodiment as a telephoto lens.

EXAMPLE

Hereinafter, each example of the present application will be described with reference to the drawings. FIGS. 1, 3, 5, and 7 show configurations of the catadioptric systems LS{LS(1) to LS(4)} according to examples 1 to 4. In each of FIGS. 1, 3, 5, and 7, each reflecting mirror is represented by a combination of a letter M and a numeral, each lens group is represented by a combination of a letter G and a numeral, and each lens is represented by a combination of a letter L and a numeral, respectively. In this case, to prevent complication by increasing types and numbers of letters and the numerals, lens groups and the like are represented by using combinations of letters and numerals independently for each example. Therefore, even if the same letter and numeral combination are used between the examples, it does not mean that they have the same configuration.

Tables 1 to 4 are shown below. Among which, Table 1 is a table showing data values in Example 1, Table 2 is Example 2, Table 3 is Example 3 and Table 4 is Example 4, respectively. In each example, d-line (wavelength λ=587.6 nm), g-line (wavelength λ=435.8 nm) and t-line (wavelength λ=1013.9 nm) are selected as objects for calculation of aberration characteristics.

In [Data] of each table, f represents a focal length of the entire catadioptric system LS, f2 represents a focal length of the second lens group G2, FNO represents an F number, ω represents a half angle of view (unit is "°"), BF represents a back focus, RC represents a center shielding diameter of a first surface (incident surface of light with respect to the catadioptric system LS), |Dexit| presents a distance from the image surface to the exit pupil of the catadioptric system LS.

In [Lens Data], a surface number represents a number of each lens surface counted from the object side, R represents a radius of curvature of each lens surface, D represents a distance between each lens surface, nd presents a refractive index with respect to d-line (wavelength λ=587.6 nm), νd represents an Abbe number with respect to the d-line (wavelength λ=587.6 nm), and φ represents an effective diameter. In [Conditional Expression Corresponding Value], a corresponding value of each conditional expression is shown. Sign "*a" attached to the right of the first column (surface number) represents that the lens surface is a reflecting surface. Sign "∞" of a radius of curvature represents a plane or an aperture, and description of the refractive index of air nd=1.000000 is omitted. As for a sign of a radius of curvature, a radius of curvature of the lens surface having a convex surface facing the object side is set to a positive value.

In general, "mm" is used as a unit of a focal length f, a radius of curvature R, and other lengths which are listed in all the following data values, but even if an optical system is proportionally enlarged or proportionally reduced, the same optical performance can be obtained. Therefore, the present invention is not limited to this. The description of the table so far is common to all the examples, and redundant explanation will be omitted below.

Example 1

First, Example 1 of the present application will be described with reference to FIGS. 1 to 2 and Table 1. FIG. 1 shows a configuration diagram of a catadioptric system LS(1) according to Example 1. The catadioptric system LS(1) according to Example 1 is constituted of the first reflecting mirror M1, the second reflecting mirror M2, the first lens group G1, and the second lens group G2, which are arranged along the optical axis.

The first reflecting mirror M1 is formed in a disk shape having the aperture part Ho1 at the center, and is arranged to face the object side. The first reflecting mirror M1 reflects the light from the object toward the second reflecting mirror M2. The first reflecting mirror M1 is a back reflection mirror having the first transmitting surface Th1 on the front side that can transmit the light from the object side, and the first reflecting surface Rf1 on the back side that can reflect the light transmitted through the first transmitting surface Th1. The first transmitting surface Th1 is formed in a spherical shape having a concave surface facing the light incident side (object side). The first reflecting surface Rf1 is formed in a spherical shape having a concave surface facing the light incident side (object side). The radius of curvature of the first reflecting surface Rf1 is different from the radius of curvature of the first transmitting surface Th1. The aperture part Ho1 is formed to penetrate through the central portion of the first reflecting mirror M1, and light reflected by the second reflecting mirror M2 and transmitted through the first lens group G1 and the second lens group G2 can pass toward the image surface I side.

The second reflecting mirror M2 is formed in a disk shape having an outer diameter smaller than that of the first reflecting mirror M1, and is arranged to face the aperture part Ho1 of the first reflecting mirror M1. The second reflecting mirror M2 reflects the light reflected by the first reflecting mirror M1 toward the aperture part Ho1 of the first reflecting mirror M1. The second reflecting mirror M2 is a back reflection mirror having the second transmitting surface Th2 on the front side that can transmit the light from the first reflecting mirror M1, and the second reflecting surface Rf2 on the back side that can reflect the light transmitted through the second transmitting surface Th2. The second transmitting surface Th2 is formed in a spherical shape having a concave surface facing the light incident side (image surface I side). The second reflecting surface Rf2 is formed in a spherical shape having a convex surface facing the light incident side (image surface I side). The radius of curvature of the second reflecting surface Rf2 is different from the radius of curvature of the second transmitting surface Th2. An aperture stop S is arranged on the second reflecting surface Rf2.

The first lens group G1 is constituted of only one first lens L1 and is arranged between the first reflecting mirror M1 and the second reflecting mirror M2. The first lens group G1 transmits the light reflected by the first reflecting mirror M1 and traveling toward the second reflecting mirror M2, and transmits the light reflected by the second reflecting mirror M2. The first lens L1 is a positive meniscus lens having a convex surface facing the side (image surface I side) on which the first reflecting mirror M1 is arranged. The lens surfaces on both sides of the first lens L1 are spherical.

The second lens group G2 is constituted of a second lens L2 and a third lens L3, which are arranged in order from the object side along the optical axis. The second lens L2 and the third lens L3 of the second lens group G2 are arranged between the first reflecting mirror M1 and the first lens group G1. The second lens group G2 transmits the light reflected by the second reflecting mirror M2 and transmitted through the first lens group G1. As a result, the image of the object is formed by light transmitted through the first lens group G1 and the second lens group G2. The second lens L2 is a meniscus shaped positive lens having a convex surface facing the image surface I side. The lens surfaces on both sides of the second lens L2 are spherical. The third lens L3 is a meniscus shaped negative lens having a convex surface facing the object side. The lens surfaces on both sides of the third lens L3 are spherical. A stray light aperture which is not shown is arranged between the first lens group G1 and the second lens group G2.

Quartz glass is used as a material of the optical element on which the first transmitting surface Th1 and the first reflecting surface Rf1 constituting the first reflecting mirror M1 are formed. Similarly, quartz glass is used as a material of the optical element on which the second transmitting surface Th2 and the second reflecting surface Rf2 constituting the second reflecting mirror M2 are formed. Similarly, quartz glass is used as a material of the first lens L1 constituting the first lens group G1. Similarly, quartz glass is used as a material of the second lens L2 and the third lens L3 constituting the second lens group G2. A coefficient of linear thermal expansion of quartz glass is about $5.1 \times 10^{-7}$/K, for example, in the range of 0 to 100° C. A specific gravity of quartz glass is about 2.2 g/cm$^3$.

Table 1 below shows the various data in Example 1. The first surface is the incident surface of light (surface on which an aperture of the lens barrel 2 is provided) with respect to the catadioptric system LS(1) according to Example 1.

TABLE 1

[Data]
f = 859.26
f2 = −208.99
FNO = 6.6
ω = 1.44°
BF = 175.06
RC = 80.7
|Dexit| = 260.35

| [Lens data] | | | | | | |
|---|---|---|---|---|---|---|
| Surface number | R | D | nd | vd | φ | |
| 1 | ∞ | 141.26 | | | 153.4 | (aperture stop) |
| 2 | −403.274 | 6.51 | 1.45847 | 67.8 | 146.7 | (stray light aperture) |
| 3*a | −559.404 | −6.51 | 1.45847 | 67.8 | 147.4 | |
| 4 | −403.274 | −149.72 | | | 143.7 | |
| 5 | −99.039 | −9.76 | 1.45847 | 67.8 | 69.3 | |
| 6 | −1003.581 | −5.21 | | | 67.0 | |
| 7 | 304.543 | −6.51 | 1.45847 | 67.8 | 64.5 | |
| 8*a | −371.850 | 6.51 | 1.45847 | 67.8 | 61.4 | |
| 9 | 304.543 | 5.21 | | | 61.4 | |
| 10 | −1003.581 | 9.76 | 1.45847 | 67.8 | 61.7 | |
| 11 | −99.039 | 65.10 | | | 62.2 | |
| 12 | ∞ | 37.69 | | | 49.5 | |
| 13 | −84.395 | 6.51 | 1.45847 | 67.8 | 43.3 | |
| 14 | −78.131 | 5.50 | | | 43.5 | |

TABLE 1-continued

| | | | | | |
|---|---|---|---|---|---|
| 15 | 276.139 | 4.56 | 1.45847 | 67.8 | 41.6 |
| 16 | 65.824 | BF | | | 40.3 |

[Conditional expression corresponding value]
Conditional expression (1) f/|f2| = 4.10
Conditional expression (2) RM1a/RM1b = 0.72
Conditional expression (3) RM2a/RM2b = −0.82
Conditional expression (4) R1a/R1b = 0.10
Conditional expression (5) RM1b/RM2b = 1.50
Conditional expression (6) |Dexit|/f = 0.30

Figure 2:
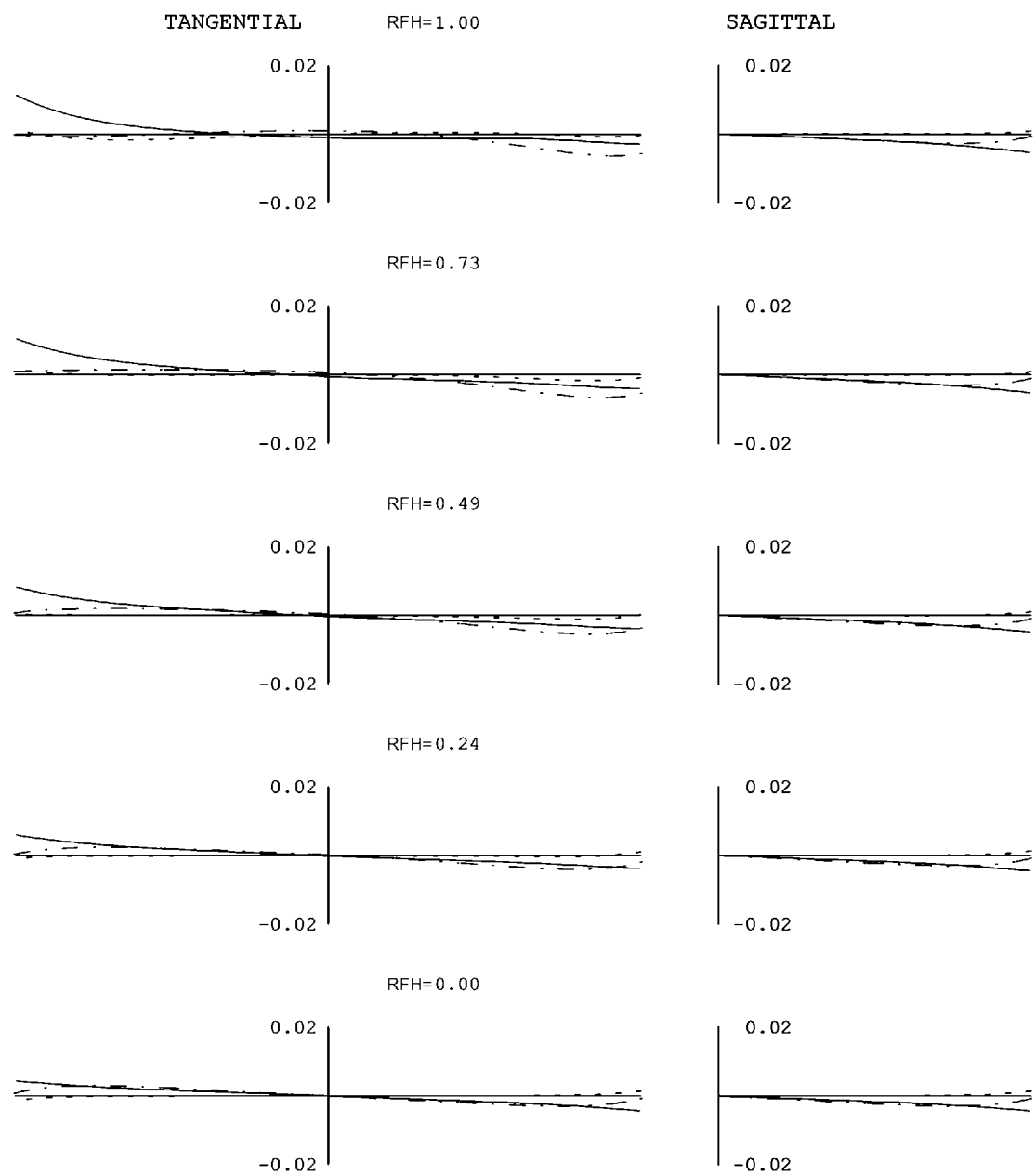
FIG. 2 shows lateral aberration graphs of the catadioptric system according to Example 1.

FIG. 2 shows lateral aberration graphs of the catadioptric system LS(1) according to Example 1. In the lateral aberration graphs, the broken line, the one-dot chain line, and the solid-line show the aberrations at the d-line (λ=587.6 nm), the g-line (λ=435.8 nm), and the t-line (wavelength λ=1013.9 nm), respectively. In the lateral aberration graphs, RFH represents the image height ratio (Relative Field Height). In the aberration graphs of each of the examples shown below, the same signs as in this example are used, and redundant explanation will be omitted. From the lateral aberration graphs, it can be seen that in Example 1, the various aberrations are well corrected, and excellent image forming performance is obtained.

Example 2

Figure 3:
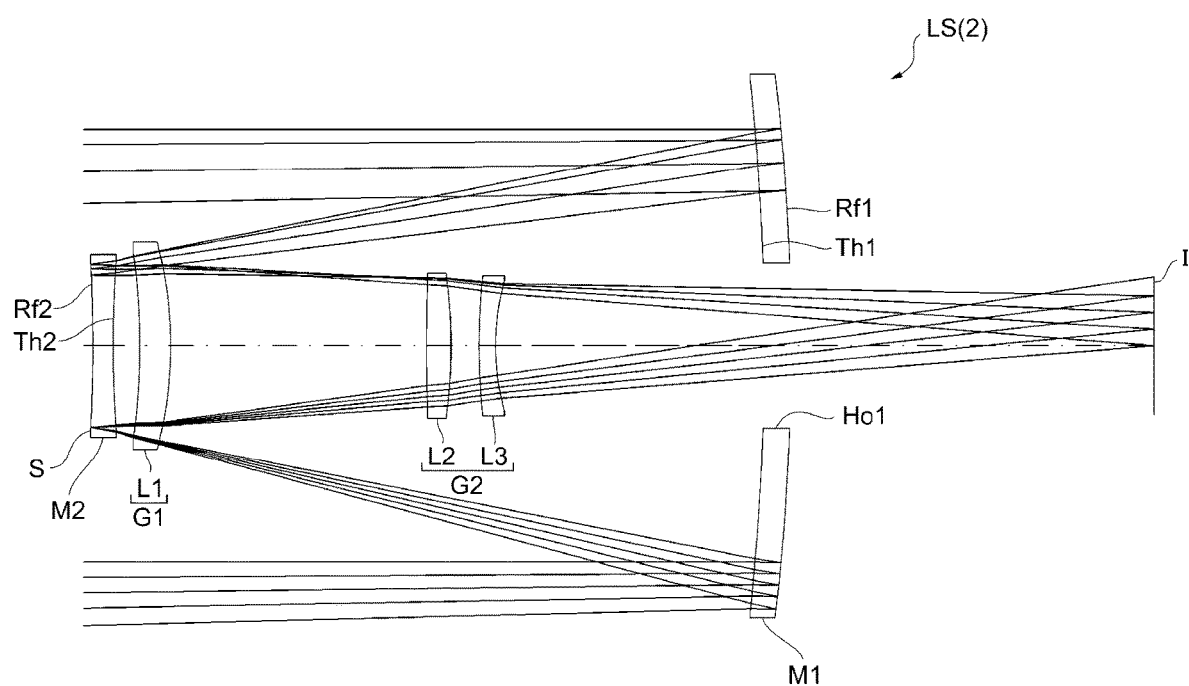
FIG. 3 shows a configuration diagram of a catadioptric system according to Example 2.

Hereinafter, Example 2 of the present application will be described with reference to FIGS. 3 to 4 and Table 2. FIG. 3 shows a configuration diagram of a catadioptric system LS(2) according to Example 2. The catadioptric system LS(2) according to Example 2 is constituted of the first reflecting mirror M1, the second reflecting mirror M2, the first lens group G1, and the second lens group G2, which are arranged along the optical axis. In Example 2, the first reflecting mirror M1, the second reflecting mirror M2, and the first lens group G1 have the same configuration as in Example 1, and the same signs as in the case of Example 1 are given, and a detailed description thereof will be omitted.

The second lens group G2 is constituted of the second lens L2 and the third lens L3, which are arranged in order from the object side along the optical axis. The second lens L2 and the third lens L3 of the second lens group G2 are arranged between the first reflecting mirror M1 and the first lens group G1. The second lens group G2 transmits the light reflected by the second reflecting mirror M2 and transmitted through the first lens group G1. As a result, the image of the object is formed by the light transmitted through the first lens group G1 and the second lens group G2. The second lens L2 is a biconvex positive lens. The lens surfaces on both sides of the second lens L2 are spherical. The third lens L3 is a meniscus shaped negative lens having a convex surface facing the object side. The lens surfaces on both sides of the third lens L3 are spherical. The stray light aperture which is not shown is arranged between the first lens group G1 and the second lens group G2.

Quartz glass is used as a material of the optical element on which the first transmitting surface Th1 and the first reflecting surface Rf1 constituting the first reflecting mirror M1 are formed. Similarly, quartz glass is used as a material of the optical element on which the second transmitting surface Th2 and the second reflecting surface Rf2 constituting the second reflecting mirror M2 are formed. Similarly, quartz glass is used as a material of the first lens L1 constituting the first lens group G1. Similarly, quartz glass is used as a material of the second lens L2 and the third lens L3 constituting the second lens group G2.

Table 2 below shows the various data in Example 2. The first surface is the incident surface of light (surface on which the aperture of the lens barrel 2 is provided) with respect to the catadioptric system LS(2) according to Example 2.

TABLE 2

[Data]
f = 859.26
f2 = 14802.50
FNO = 6.3
ω = 1.44°
BF = 209.26
RC = 72.3
|Dexit| = 317.92

[Lens data]

| Surface number | R | D | nd | νd | φ | |
|---|---|---|---|---|---|---|
| 1 | ∞ | 185.52 | | | 175.1 | (aperture stop) |
| 2 | −779.543 | 8.46 | 1.45847 | 67.8 | 166.0 | (stray light aperture) |
| 3*a | −730.348 | −8.46 | 1.45847 | 67.8 | 166.2 | |
| 4 | −779.543 | −88.78 | | | 162.8 | |
| 5 | −126.859 | −9.76 | 1.45847 | 67.8 | 62.1 | |
| 6 | −204.625 | −8.46 | | | 58.0 | |
| 7 | 374.574 | −6.51 | 1.45847 | 67.8 | 54.5 | |
| 8*a | −540.073 | 6.51 | 1.45847 | 67.8 | 51.4 | |
| 9 | 374.574 | 8.46 | | | 50.9 | |
| 10 | −204.625 | 9.76 | 1.45847 | 67.8 | 50.7 | |
| 11 | −126.859 | 78.11 | | | 51.1 | |
| 12 | ∞ | 3.25 | | | 43.0 | |

TABLE 2-continued

| | | | | | |
|---|---|---|---|---|---|
| 13 | 606.874 | 7.81 | 1.45847 | 67.8 | 43.0 |
| 14 | −162.790 | 8.93 | | | 43.0 |
| 15 | 207.980 | 5.21 | 1.45847 | 67.8 | 41.4 |
| 16 | 77.027 | BF | | | 40.3 |

[Conditional expression corresponding value]
Conditional expression (1) f/|f2| = 0.06
Conditional expression (2) RM1a/RM1b = 1.07
Conditional expression (3) RM2a/RM2b = −0.69
Conditional expression (4) R1a/R1b = 0.62
Conditional expression (5) RM1b/RM2b = 1.35
Conditional expression (6) |Dexit|/f = 0.37

Figure 4:
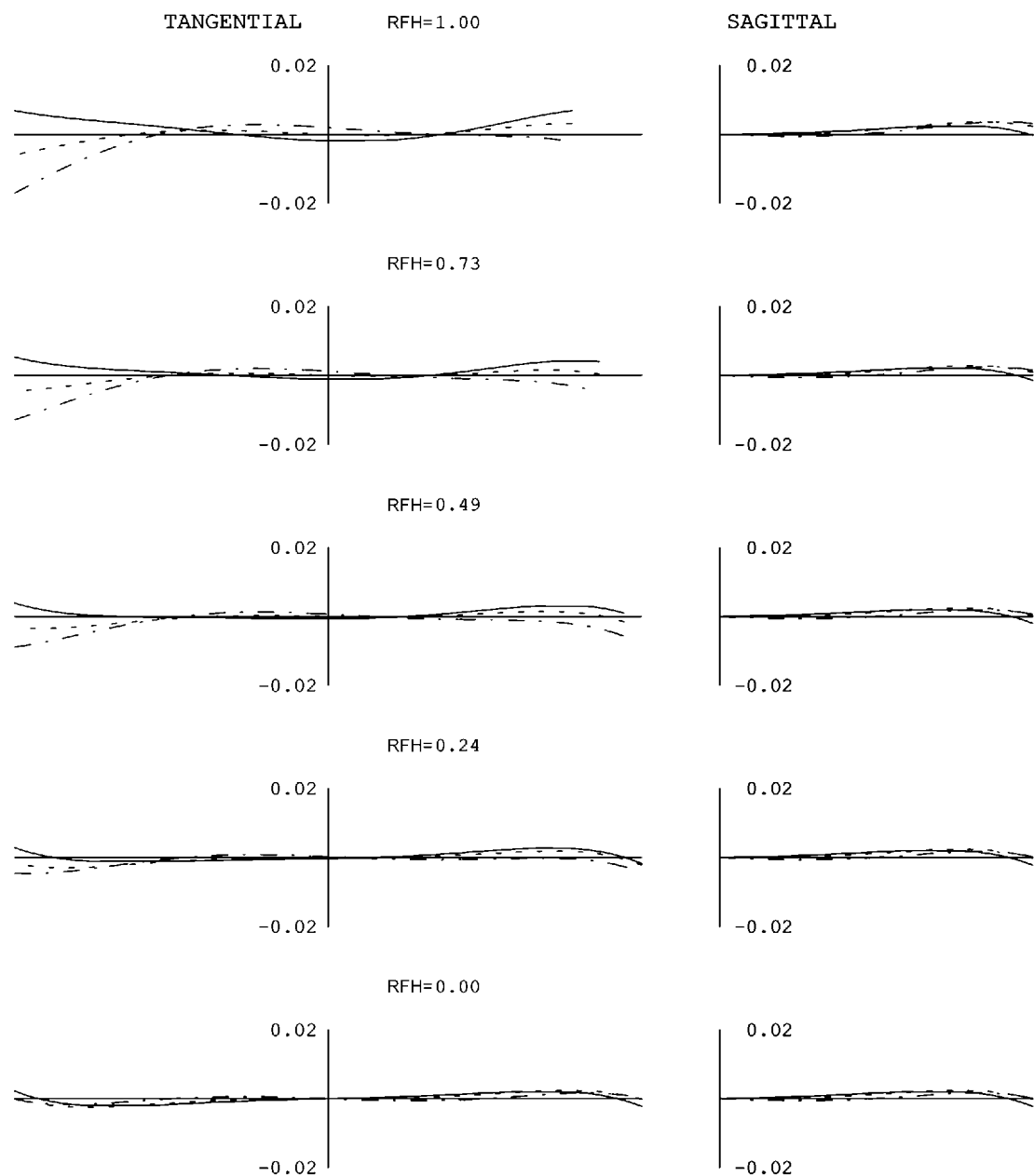
FIG. 4 shows lateral aberration graphs of the catadioptric system according to Example 2.

FIG. 4 shows lateral aberration graphs of the catadioptric system LS(2) according to Example 2. From the lateral aberration graphs, it can be seen that in Example 2, the various aberrations are well corrected, and excellent image forming performance is obtained.

Example 3

Figure 5:
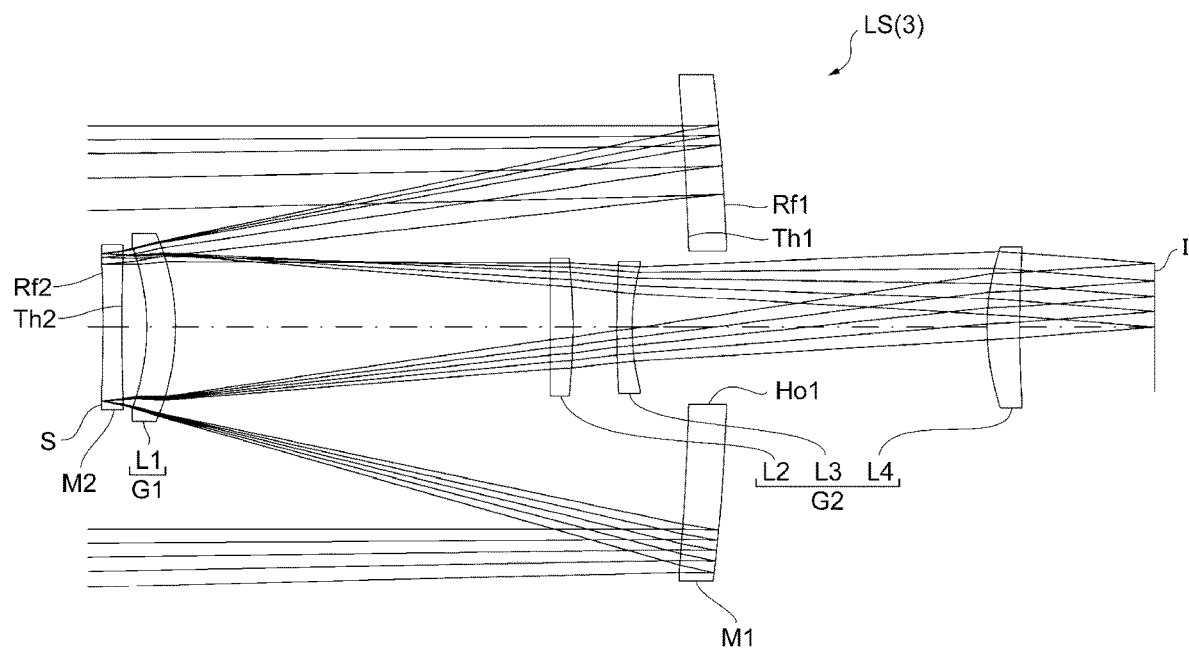
FIG. 5 shows a configuration diagram of a catadioptric system according to Example 3.

Hereinafter, Example 3 of the present application will be described with reference to FIGS. 5 to 6 and Table 3. FIG. 5 shows a configuration diagram of a catadioptric system LS(3) according to Example 3. The catadioptric system LS(3) according to Example 3 is constituted of the first reflecting mirror M1, the second reflecting mirror M2, the first lens group G1, and the second lens group G2, which are arranged along the optical axis. In Example 3, the first reflecting mirror M1 and the second reflecting mirror M2 have the same configuration as in Example 1, and the same signs as in the case of Example 1 are given, and a detailed description thereof will be omitted.

The first lens group G1 is constituted of only one first lens L1 and is arranged between the first reflecting mirror M1 and the second reflecting mirror M2. The first lens group G1 transmits the light reflected by the first reflecting mirror M1 and traveling toward the second reflecting mirror M2, and transmits the light reflected by the second reflecting mirror M2. The first lens L1 is a negative meniscus lens having a convex surface facing the side (image surface I side) on which the first reflecting mirror M1 is arranged. The lens surfaces on both sides of the first lens L1 are spherical.

The second lens group G2 is constituted of the second lens L2, the third lens L3, and a fourth lens L4, which are arranged in order from the object side along the optical axis. The second lens L2 and the third lens L3 of the second lens group G2 are arranged between the first reflecting mirror M1 and the first lens group G1. The fourth lens L4 of the second lens group G2 is arranged between the first reflecting mirror M1 and the image surface I. The second lens group G2 transmits the light reflected by the second reflecting mirror M2 and transmitted through the first lens group G1. As a result, the image of the object is formed by the light transmitted through the first lens group G1 and the second lens group G2. The second lens L2 is a biconvex positive lens. The lens surfaces on both sides of the second lens L2 are spherical. The third lens L3 is a meniscus shaped negative lens having a convex surface facing the object side. The lens surfaces on both sides of the third lens L3 are spherical. The fourth lens L4 is a meniscus shaped positive lens having a convex surface facing the object side. The lens surfaces on both sides of the fourth lens L4 are spherical. The stray light aperture which is not shown is arranged between the first lens group G1 and the second lens group G2.

Quartz glass is used as a material of the optical element on which the first transmitting surface Th1 and the first reflecting surface Rf1 constituting the first reflecting mirror M1 are formed. Similarly, quartz glass is used as a material of the optical element on which the second transmitting surface Th2 and the second reflecting surface Rf2 constituting the second reflecting mirror M2 are formed. Similarly, quartz glass is used as a material of the first lens L1 constituting the first lens group G1. Similarly, quartz glass is used as a material of the second lens L2, the third lens L3, and the fourth lens L4 constituting the second lens group G2.

Table 3 below shows the various data in Example 3. The first surface is the incident surface of light (surface on which the aperture of the lens barrel 2 is provided) with respect to the catadioptric system LS(3) according to Example 3.

TABLE 3

[Data]
f = 859.26
f2 = 307.22
FNO = 6.3
ω = 1.44°
BF = 45.94
RC = 72.3
|Dexit| = 5027.53

[Lens data]

| Surface number | R | D | nd | vd | φ | |
|---|---|---|---|---|---|---|
| 1 | ∞ | 172.50 | | | 174.4 | (aperture stop) |
| 2 | −943.552 | 13.02 | 1.45847 | 67.8 | 165.9 | (stray light aperture) |
| 3*a | −738.268 | −13.02 | 1.45847 | 67.8 | 166.1 | |
| 4 | −943.552 | −175.76 | | | 161.0 | |
| 5 | −80.835 | −9.76 | 1.45847 | 67.8 | 60.4 | |

TABLE 3-continued

| | | | | | |
|---|---|---|---|---|---|
| 6 | −78.932 | −8.46 | | | 54.8 |
| 7 | 849.598 | −6.51 | 1.45847 | 67.8 | 53.0 |
| 8 | −678.636 | 6.51 | 1.45847 | 67.8 | 50.2 |
| 9*a | 849.598 | 8.46 | | | 49.6 |
| 10 | −78.932 | 9.76 | 1.45847 | 67.8 | 49.2 |
| 11 | −80.835 | 71.60 | | | 50.6 |
| 12 | ∞ | 56.23 | | | 44.3 |
| 13 | 4145.615 | 7.81 | 1.45847 | 67.8 | 44.0 |
| 14 | −207.703 | 15.24 | | | 43.9 |
| 15 | 409.401 | 5.21 | 1.45847 | 67.8 | 42.1 |
| 16 | 81.728 | 121.23 | | | 41.3 |
| 17 | 85.641 | 11.07 | 1.45847 | 67.8 | 51.6 |
| 18 | 458.143 | BF | | | 50.6 |

[Conditional expression corresponding value]
Conditional expression (1) f/|f2| = 2.80
Conditional expression (2) RM1a/RM1b = 1.28
Conditional expression (3) RM2a/RM2b = −1.25
Conditional expression (4) R1a/R1b = 1.02
Conditional expression (5) RM1b/RM2b = 1.09
Conditional expression (6) |Dexit|/f = 5.85

Figure 6:
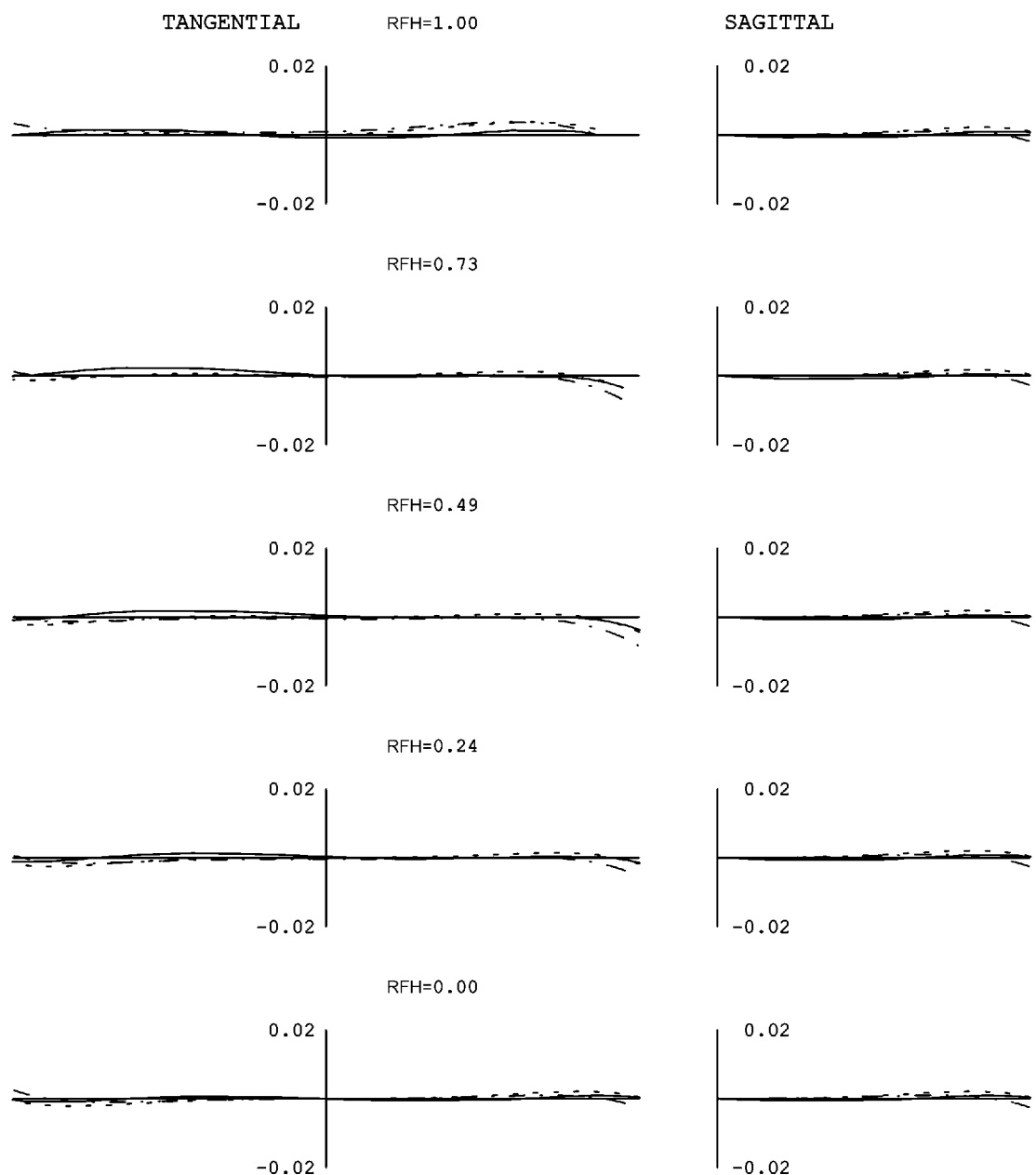
FIG. 6 shows lateral aberration graphs of the catadioptric system according to Example 3.

FIG. 6 shows lateral aberration graphs of the catadioptric system LS(3) according to Example 3. From the lateral aberration graphs, it can be seen that in Example 3, the various aberrations are well corrected, and excellent image forming performance is obtained.

Example 4

Figure 7:
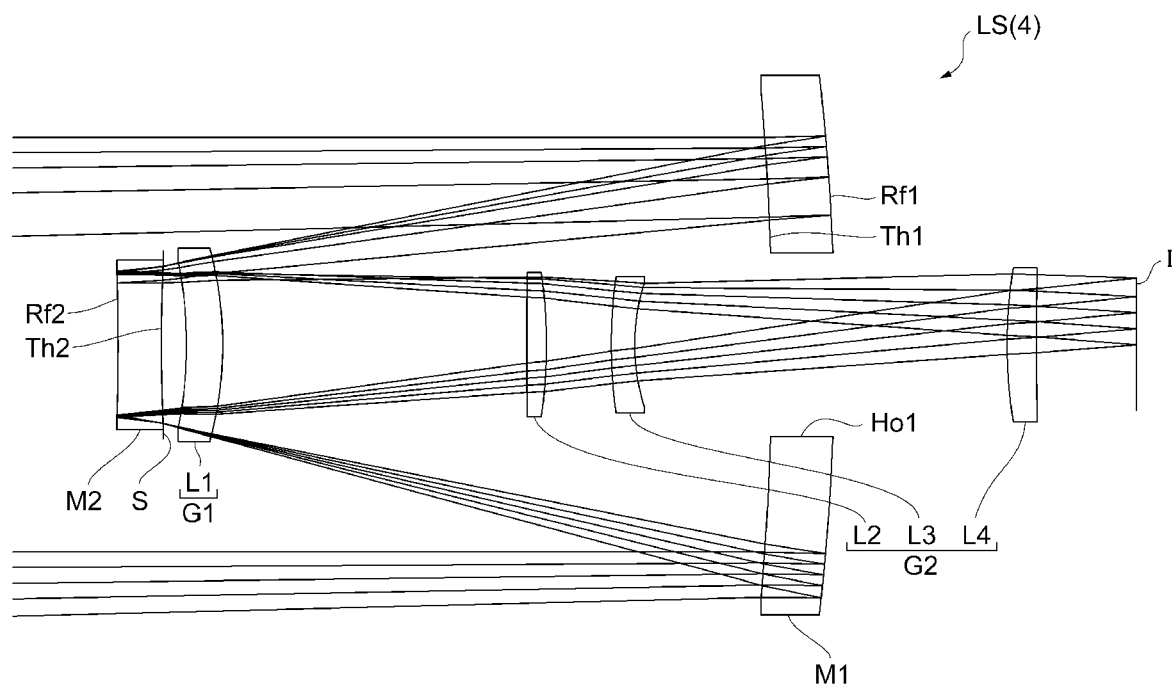
FIG. 7 shows a configuration diagram of a catadioptric system according to Example 4.

Hereinafter, Example 4 of the present application will be described with reference to FIGS. 7 to 8 and Table 4. FIG. 7 shows a configuration diagram of a catadioptric system LS(4) according to Example 4. The catadioptric system LS(4) according to Example 4 is constituted of the first reflecting mirror M1, the second reflecting mirror M2, the first lens group G1, and the second lens group G2, which are arranged along the optical axis. In Example 4, the first reflecting mirror M1 has the same configuration as in Example 1, and the same signs as in the case of Example 1 are given, and a detailed description thereof will be omitted.

The second reflecting mirror M2 is formed in a disk shape having an outer diameter smaller than that of the first reflecting mirror M1 and is arranged to face the aperture part Ho1 of the first reflecting mirror M1. The second reflecting mirror M2 reflects the light reflected by the first reflecting mirror M1 toward the aperture part Ho1 of the first reflecting mirror M1. The second reflecting mirror M2 is the back reflection mirror having the second transmitting surface Th2 on the front side that can transmit the light from the first reflecting mirror M1, and the second reflecting surface Rf2 on the back side that can reflect the light transmitted through the second transmitting surface Th2. The second transmitting surface Th2 is formed in a spherical shape having a concave surface facing the light incident side (image surface I side). The second reflecting surface Rf2 is formed in a spherical shape having a convex surface facing the light incident side (image surface I side). The radius of curvature of the second reflecting surface Rf2 is different from the radius of curvature of the second transmitting surface Th2. The aperture stop S is arranged on the second transmitting surface Th2.

The first lens group G1 is constituted of only one first lens L1 and is arranged between the first reflecting mirror M1 and the second reflecting mirror M2. The first lens group G1 transmits the light reflected by the first reflecting mirror M1 and traveling toward the second reflecting mirror M2, and transmits the light reflected by the second reflecting mirror M2. The first lens L1 is a positive meniscus lens having a convex surface facing the side (image surface I side) on which the first reflecting mirror M1 is arranged. The lens surfaces on both sides of the first lens L1 are spherical.

The second lens group G2 is constituted of the second lens L2, the third lens L3, and the fourth lens L4, which are arranged in order from the object side along the optical axis. The second lens L2 and the third lens L3 of the second lens group G2 are arranged between the first reflecting mirror M1 and the first lens group G1. The fourth lens L4 of the second lens group G2 is arranged between the first reflecting mirror M1 and the image surface I. The second lens group G2 transmits the light reflected by the second reflecting mirror M2 and transmitted through the first lens group G1. As a result, the image of the object is formed by the light transmitted through the first lens group G1 and the second lens group G2. The second lens L2 is a biconvex positive lens. The lens surfaces on both sides of the second lens L2 are spherical. The third lens L3 is a meniscus shaped negative lens having a convex surface facing the object side. The lens surfaces on both sides of the third lens L3 are spherical. The fourth lens L4 is a meniscus shaped positive lens having a convex surface facing the object side. The lens surfaces on both sides of the fourth lens L4 are spherical. The stray light aperture which is not shown is arranged between the first lens group G1 and the second lens group G2.

Quartz glass is used as a material of the optical element on which the first transmitting surface Th1 and the first reflecting surface Rf1 constituting the first reflecting mirror M1 are formed. Similarly, quartz glass is used as a material of the optical element on which the second transmitting surface Th2 and the second reflecting surface Rf2 constituting the second reflecting mirror M2 are formed. Similarly, quartz glass is used as a material of the first lens L1 constituting the first lens group G1. Similarly, quartz glass is used as a material of the second lens L2, the third lens L3, and the fourth lens L4 constituting the second lens group G2.

Table 4 below shows the various data in Example 4. The first surface is the incident surface of light (surface on which the aperture of the lens barrel 2 is provided) with respect to the catadioptric system LS(4) according to Example 4.

TABLE 4

[Data]
f = 859.26
f2 = 504.06
FNO = 6.3
ω = 1.44°
BF = 32.98
RC = 72.0
|Dexit| = 771.62

[Lens data]

| Surface number | R | D | nd | νd | φ | |
|---|---|---|---|---|---|---|
| 1 | ∞ | 217.18 | | | 176.3 | (aperture stop) |
| 2 | −957.090 | 20.75 | 1.45847 | 67.8 | 166.0 | (stray light aperture) |
| 3*a | −773.034 | −20.75 | 1.45847 | 67.8 | 166.0 | |
| 4 | −957.090 | −181.53 | | | 166.0 | |
| 5 | −119.707 | −11.99 | 1.45847 | 67.8 | 60.3 | |
| 6 | −132.217 | −7.77 | | | 54.5 | |
| 7 | ∞ | −0.66 | | | 51.6 | |
| 8*a | 506.098 | −14.26 | 1.45847 | 67.8 | 51.6 | |
| 9 | −636.999 | 14.26 | 1.45847 | 67.8 | 48.6 | |
| 10 | 506.098 | 8.43 | | | 51.9 | |
| 11 | −132.217 | 11.99 | 1.45847 | 67.8 | 54.5 | |
| 12 | −119.707 | 82.34 | | | 60.3 | |
| 13 | ∞ | 18.15 | | | 44.1 | |
| 14 | 1916.086 | 6.48 | 1.45847 | 67.8 | 44.7 | |
| 15 | −167.799 | 21.39 | | | 44.7 | |
| 16 | 152.338 | 7.78 | 1.45847 | 67.8 | 42.1 | |
| 17 | 65.842 | 123.18 | | | 40.8 | |
| 18 | 155.591 | 9.72 | 1.45847 | 67.8 | 46.7 | |
| 19 | 1242.230 | 32.98 | | | 46.7 | |

[Conditional expression corresponding value]
Conditional expression (1) f/|f2| = 1.70
Conditional expression (2) RM1a/RM1b = 1.24
Conditional expression (3) RM2a/RM2b = −0.79
Conditional expression (4) R1a/R1b = 0.91
Conditional expression (5) RM1b/RM2b = 1.21
Conditional expression (6) |Dexit|/f = 0.90

Figure 8:
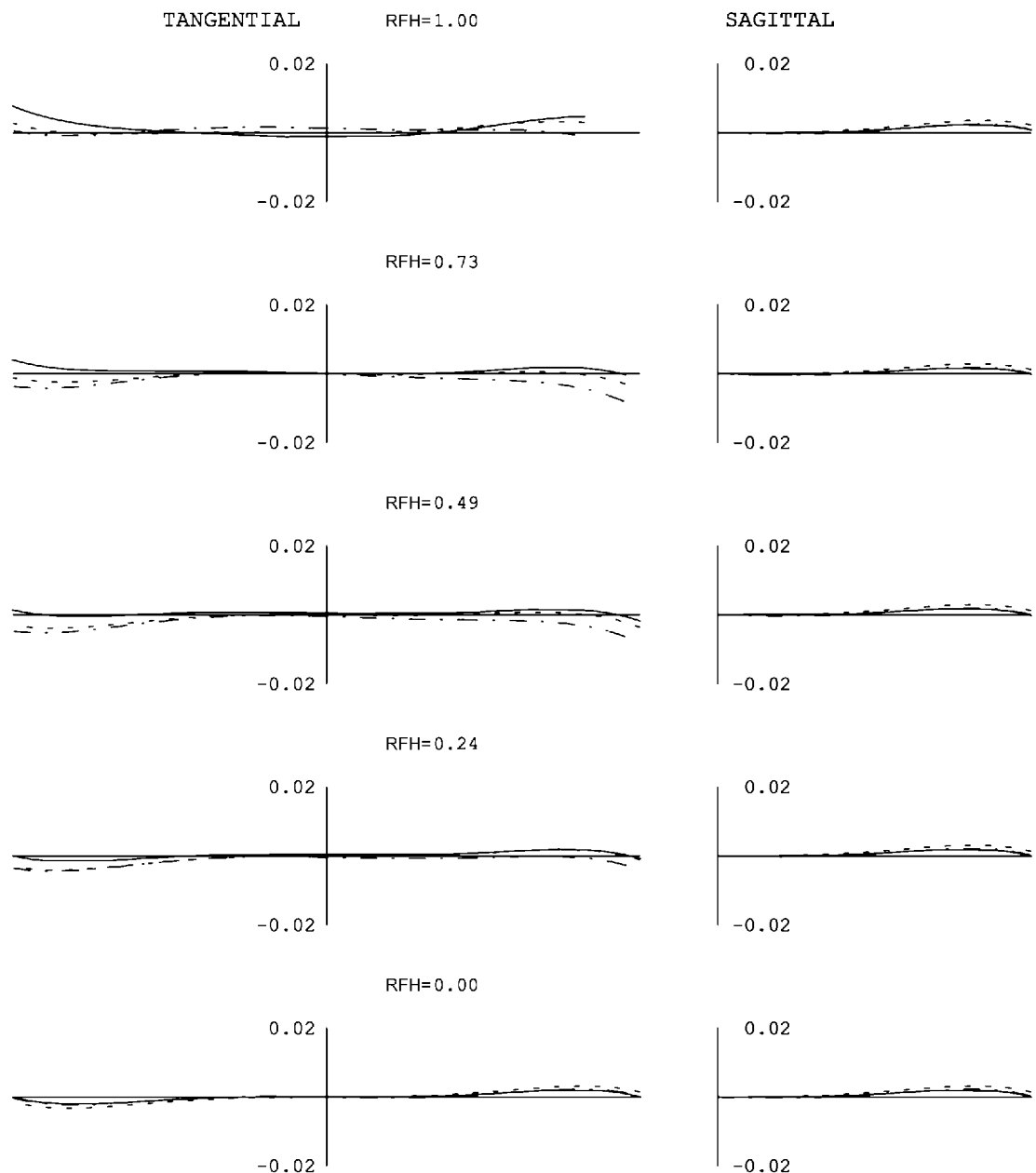
FIG. 8 shows lateral aberration graphs of the catadioptric system according to Example 4.

FIG. 8 shows lateral aberration graphs of the catadioptric system LS(4) according to Example 4. From the lateral aberration graphs, it can be seen that in Example 4, the various aberrations are well corrected, and excellent image forming performance is obtained.

As described above, according to each example, it is possible to provide a catadioptric system with a simple structure and low manufacturing cost and a telescope (optical device) comprising the same.

The following contents can be suitably adopted within the range that does not impair the optical performance of the optical system of the present embodiment.

Although the two-group structure is shown as the lens group constituting the catadioptric system of the present embodiment, the present application is not limited to this, and other group structures (for example, three-group or the like) can be used. Specifically, it may be a structure in which a lens or a lens group is added to the most image surface side of the catadioptric system of the present embodiment.

A part of each lens surface is not limited to a spherical surface and may be formed of an aspherical surface. The aspherical surface may be either an aspherical surface formed by grinding, a glass molding aspherical surface formed by forming a glass into an aspherical shape by a mold, or a composite aspherical surface in which resin is formed in an aspherical shape on the surface of glass.

Further, the material of each of the optical elements constituting the first reflecting mirror M1 and the second reflecting mirror M2, and each of the lenses constituting the first lens group G1 and the second lens group G2 is not limited to quartz glass, but may be another glass material (for example, having a coefficient of linear thermal expansion of $6 \times 10^{-7}$/K or less).

EXPLANATION OF NUMERALS AND CHARACTERS

1 Telescope (Optical device)
LS Catadioptric system
M1 First reflecting mirror
Ho1 Aperture part
Th1 First transmitting surface
Rf1 First reflecting surface
M2 Second reflecting mirror
Th2 Second transmitting surface
Rf2 Second reflecting surface
G1 First lens group
G2 Second lens group
I Image surface

RELATED APPLICATIONS

This is a continuation of PCT International Application No. PCT/JP2017/032660, filed on Sep. 11, 2017, which is hereby incorporated by reference. This application also claims the benefit of Japanese Patent Application No. 2016-195940, filed in Japan on Oct. 3, 2016, which is hereby incorporated by reference.

The invention claimed is:

1. A catadioptric system comprising:
a first reflecting mirror on which light from an object is incident directly, the first reflecting mirror being configured to reflect the light;
a second reflecting mirror that reflects light reflected by the first reflecting mirror;
a first lens group that transmits light reflected by the first reflecting mirror and traveling toward the second reflecting mirror, and transmits light reflected by the second reflecting mirror; and
a second lens group that transmits light reflected by the second reflecting mirror and transmitted through the first lens group, wherein
an image of the object is formed by light transmitted through the second lens group,
the second reflecting mirror is a rear-surface reflecting type mirror having a second transmitting surface that can transmit light from the first reflecting mirror, and a second reflecting surface that can reflect light transmitted through the second transmitting surface,
a radius of curvature of the second transmitting surface is different from a radius of curvature of the second reflecting surface,
the second transmitting surface and the second reflecting surface are spherical,
the first lens group consists of one lens, and
the following conditional expressions are satisfied:

$$0 \leq f/|f2| < 5.50$$

$$-2.00 < RM2a/RM2b < -0.50$$

$$-0.50 < R1a/R1b < 1.50$$

where,
f: a focal length of the catadioptric system
|f2|: a focal length of the second lens group
RM2a: the radius of curvatures of the second transmitting surface
RM2b: the radius of curvature of the second reflecting surface
R1a: a radius of curvatures of a lens surface of the lens of the first lens group on a side on which the first reflecting mirror is arranged
R1b: a radius of curvature of a lens surface of the lens of the first lens group on a side on which the second reflecting mirror is arranged.

2. The catadioptric system according to claim 1, wherein the first reflecting mirror has a concave shape on a light incident side, and
the second reflecting mirror has a convex shape on the light incident side.

3. The catadioptric system according to claim 1, wherein the first lens group consists of one positive meniscus lens.

4. The catadioptric system according to claim 1, wherein each lens surface of the first lens group is spherical.

5. The catadioptric system according to claim 1, wherein the first reflecting mirror is a rear-surface reflecting type mirror having a first transmitting surface that can transmit the light from the object, and a first reflecting surface that can reflect the light transmitted through the first transmitting surface, and
the following conditional expression is satisfied:

$$0.80 < RM1b/RM2b < 2.00$$

where,
RM1b: the radius of curvature of the first reflecting surface.

6. The catadioptric system according to claim 1, wherein the second lens group consists of a first positive lens, a negative lens, and a second positive lens, which are arranged in order from an object side along an optical axis.

7. The catadioptric system according to claim 1, wherein each lens surface of the second lens group is spherical.

8. The catadioptric system according to claim 1, wherein the following conditional expression is satisfied:

$$|Dexit|/f \geq 0.3$$

where,
|Dexit|: a distance from an image surface to an exit pupil of the catadioptric system.

9. An optical device comprising the catadioptric system according to claim 1.

10. The catadioptric system according to claim 1, wherein the first reflecting mirror has an aperture part, and
the aperture part is provided at a position through which the light reflected by the second reflecting mirror and transmitted through the first lens group can pass.

11. The catadioptric system according to claim 10, wherein
the second reflecting mirror is arranged to face the aperture part of the first reflecting mirror, and
the first lens group is arranged between the first reflecting mirror and the second reflecting mirror.

12. The catadioptric system according to claim 1, wherein
the first reflecting mirror is a rear-surface reflecting type mirror having a first transmitting surface that can transmit the light from the object, and a first reflecting surface that can reflect light transmitted through the first transmitting surface, and
a radius of curvature of the first transmitting surface is different from a radius of curvature of the first reflecting surface.

13. The catadioptric system according to claim 12, wherein
the first transmitting surface and the first reflecting surface are spherical, and
the following conditional expression is satisfied:

$$0.50 < RM1a/RM1b < 2.00$$

where,
RM1a: the radius of curvature of the first transmitting surface
RM1b: the radius of curvature of the first reflecting surface.

14. The catadioptric system according to claim 1, wherein
the first reflecting mirror is a rear-surface reflecting type mirror having a first transmitting surface that can transmit the light from the object, and a first reflecting surface that can reflect the light transmitted through the first transmitting surface, and
an optical element provided with the first transmitting surface and the first reflecting surface constituting the first reflecting mirror, an optical element provided with the second transmitting surface and the second reflecting surface constituting the second reflecting mirror, and lenses constituting the first lens group and the second lens group are made of the same material.

15. The catadioptric system according to claim 14, wherein a coefficient of linear thermal expansion of the material is $6 \times 10^{-7}$/K or less.

16. The catadioptric system according to claim 14, wherein a specific gravity of the material is 3 g/cm³ or less.

17. The catadioptric system according to claim 14, wherein the material is quartz glass.

* * * * *